US010073906B2

(12) United States Patent
Lu et al.

(10) Patent No.: US 10,073,906 B2
(45) Date of Patent: Sep. 11, 2018

(54) SCALABLE TRI-POINT ARBITRATION AND CLUSTERING

(71) Applicant: Oracle International Corporation, Redwood Shores, CA (US)

(72) Inventors: Edwina Lu, Palo Alto, CA (US); Dustin Garvey, Oakland, CA (US); Sampanna Salunke, San Carlos, CA (US); Lik Wong, Palo Alto, CA (US); Aleksey Urmanov, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 178 days.

(21) Appl. No.: 15/140,358

(22) Filed: Apr. 27, 2016

(65) Prior Publication Data
US 2017/0316079 A1   Nov. 2, 2017

(51) Int. Cl.
G06F 17/30   (2006.01)
(52) U.S. Cl.
CPC .............................. G06F 17/30598 (2013.01)
(58) Field of Classification Search
CPC ................................................. G06F 17/30598
USPC ........................................................ 707/737
See application file for complete search history.

(56) References Cited

U.S. PATENT DOCUMENTS 7,739,143 B1   6/2010 Dwarakanath et al.
7,739,284 B2*  6/2010 Aggarwal ......... G06F 17/30516
                                                  707/737
7,783,510 B1   8/2010 Gilgur et al.
7,987,106 B1   7/2011 Aykin
8,200,454 B2   6/2012 Dorneich et al.
8,229,876 B2*  7/2012 Roychowdhury ... G06K 9/6223
                                                  706/54
8,234,236 B2   7/2012 Beaty et al.
(Continued)

FOREIGN PATENT DOCUMENTS

WO   20111071624 A2   6/2011
WO   20131016584 A1   1/2013

OTHER PUBLICATIONS

Jarvis, R. A., et al., "Clustering Using a Similarity Measure Based on Shared Neighbors", IEEE Transactions on Computers, vol. C-22, No. 11, Nov. 1973, pp. 1025-1034.*

(Continued)

Primary Examiner — Robert Stevens
(74) Attorney, Agent, or Firm — Invoke

(57) ABSTRACT

Techniques are described for performing cluster analysis on a set of data points using tri-point arbitration. In one embodiment, a first cluster that includes a set of data points is generated within volatile and/or non-volatile storage of a computing device. A set of tri-point arbitration similarity values are computed where each similarity value in the set of similarity values corresponds to a respective data point pair and is computed based, at least in part, on a distance between the respective data point pair and a set of one or more arbiter data points. The first cluster is partitioned within volatile and/or non-volatile storage of the computing device into a set of two or more clusters. A determination is made, based at least in part on the set of similarity values in the tri-arbitration similarity matrix, whether to continue partitioning the set of data points.

22 Claims, 9 Drawing Sheets

(56) References Cited

U.S. PATENT DOCUMENTS

| | | | |
|---|---|---|---|
| 8,363,961 B1* | 1/2013 | Avidan | G06K 9/6218 |
| | | | 382/224 |
| 8,576,964 B2 | 11/2013 | Taniguchi et al. | |
| 8,583,649 B2* | 11/2013 | Ailon | G06F 17/3071 |
| | | | 707/738 |
| 8,635,328 B2 | 1/2014 | Corley et al. | |
| 8,694,969 B2 | 4/2014 | Bernardini et al. | |
| 8,880,525 B2* | 11/2014 | Galle | G06F 17/30707 |
| | | | 707/722 |
| 9,053,171 B2* | 6/2015 | Ailon | G06F 17/3071 |
| 9,147,167 B2* | 9/2015 | Urmanov | G06N 99/005 |
| 9,330,119 B2 | 5/2016 | Chan et al. | |
| 9,355,357 B2 | 5/2016 | Hao et al. | |
| 9,495,395 B2 | 11/2016 | Chan et al. | |
| 9,514,213 B2* | 12/2016 | Wood | G06F 17/30598 |
| 9,692,662 B2 | 6/2017 | Chan et al. | |
| 9,710,493 B2* | 7/2017 | Wang | G06F 17/30256 |
| 2003/0224344 A1* | 12/2003 | Shamir | G06F 19/24 |
| | | | 435/4 |
| 2010/0027552 A1 | 2/2010 | Hill | |
| 2011/0040575 A1 | 2/2011 | Wright et al. | |
| 2011/0125894 A1 | 5/2011 | Anderson et al. | |
| 2011/0126197 A1 | 5/2011 | Larsen et al. | |
| 2011/0126275 A1 | 5/2011 | Anderson et al. | |
| 2012/0254183 A1* | 10/2012 | Ailon | G06F 17/3071 |
| | | | 707/738 |
| 2013/0326202 A1 | 12/2013 | Rosenthal et al. | |
| 2014/0067757 A1* | 3/2014 | Ailon | G06F 17/3071 |
| | | | 707/609 |
| 2014/0379717 A1* | 12/2014 | Urmanov | G06K 9/6271 |
| | | | 707/738 |
| 2015/0248446 A1 | 9/2015 | Nordstrom et al. | |
| 2016/0283533 A1* | 9/2016 | Urmanov | G06F 17/30598 |
| 2016/0299961 A1* | 10/2016 | Olsen | G06K 9/6219 |

OTHER PUBLICATIONS

Davies, David L., et al., "A Cluster Separation measure", IEEE Transactions on Pattern Analysis and Machine Intelligence, vol. PAMI-1, No. 2, Apr. 1979, pp. 224-227.*

Somlo, Gabriel, et al., "Incremental Clustering for Profile Maintenance in Information Gathering Web Agents", AGENTS '01, Montreal, Quebec, Canada, May 28-Jun. 1, 2001, pp. 262-269.*

Haugen et al., "Extracting Common Time Trends from Concurrent Time Series: Maximum Autocorrelation Factors with Applications", Stanford University, Oct. 20, 2015, pp. 1-38.

Voras et al,"Criteria for evaluation of Open Source Cloud Computing Solutions", Information Technology Interfaces (ITI), Proceedings of the ITI 2011 33rd International Conference on Information Technology Interfaces, US, IEEE, Jun. 27-30, 2011, pp. 137-142.

Taylor J W et al: "Forecasting intraday time series with multiple seasonal cycles using parsimonious seasonal exponential smoothing", OMEGA, vol. 40, No. 6, Dec. 2012 (Dec. 2012), 28 pages.

Szmit et al., "Usage of Modified Holt-Winters Method in the Anomaly Detection of Network Traffic: Case Studies", Journal of Computer Networks and Communications, vol. 2012, Article ID 192913, Mar. 29, 2012, 6 pages.

Slipetskyy, Rostyslav, "Security Issues in OpenStack", Master's Thesis, Technical University of Denmark, Jun., 2011, 100 pages.

Niino, Junichi, "Open Source Cloud infrastructure 'OpenStack', its History and Scheme", available online at <http://www.publickey1.jp/blog/11/openstack_1.html>, Jun. 13, 2011, 18 pages.

* cited by examiner $$\rho TAC(x_1,x_2|a) = \frac{\min\{\rho(x_1,a), \rho(x_2,a)\} - \rho(x_1, x_2)}{\max\{\rho(x_1, x_2), \min\{\rho(x_1,a), \rho(x_2,a)\}\}}$$

210

SCALABLE TRI-POINT ARBITRATION AND CLUSTERING

CROSS-REFERENCE TO RELATED APPLICATIONS

The present application is related to U.S. Pat. No. 9,147,162, entitled "Similarity Analysis with Tri-Point Data Arbitration"; U.S. application Ser. No. 13/833,757, entitled "Per-Attribute Data Clustering Using Tri-Point Data Arbitration", filed Mar. 15, 2013; U.S. application Ser. No. 13/969,771, entitled "Tripoint Arbitration for Entity Classification", filed Aug. 19, 2013; and U.S. Pat. No. 7,590,642, entitled "Enhanced K-Means Clustering", the entire contents for each of which are incorporated by reference as if set forth in their entirety.

TECHNICAL FIELD

The present disclosure relates to cluster analysis. In particular, the present disclosure relates to computer-implemented techniques for generating a set of clusters that group a set of data points.

BACKGROUND

Cluster analysis or clustering refers to a process through which a set of data points are organized into groups called clusters. Typically, the goal of clustering is to group the data such that data points belonging to the same cluster are more similar to each other than they are to data points belonging to other clusters. Such groupings may provide meaningful insights with respect to large data sets that may not be readily apparent from the raw data itself. Clustering has broad applicability in a variety of fields such as data mining, machine learning, psychology and other social sciences, image and signal processing, bioinformatics, data summarization, pattern recognition, and other statistical analysis. U.S. Pat. No. 7,590,642 describes various examples of performing k-means clustering to group a set of data points.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
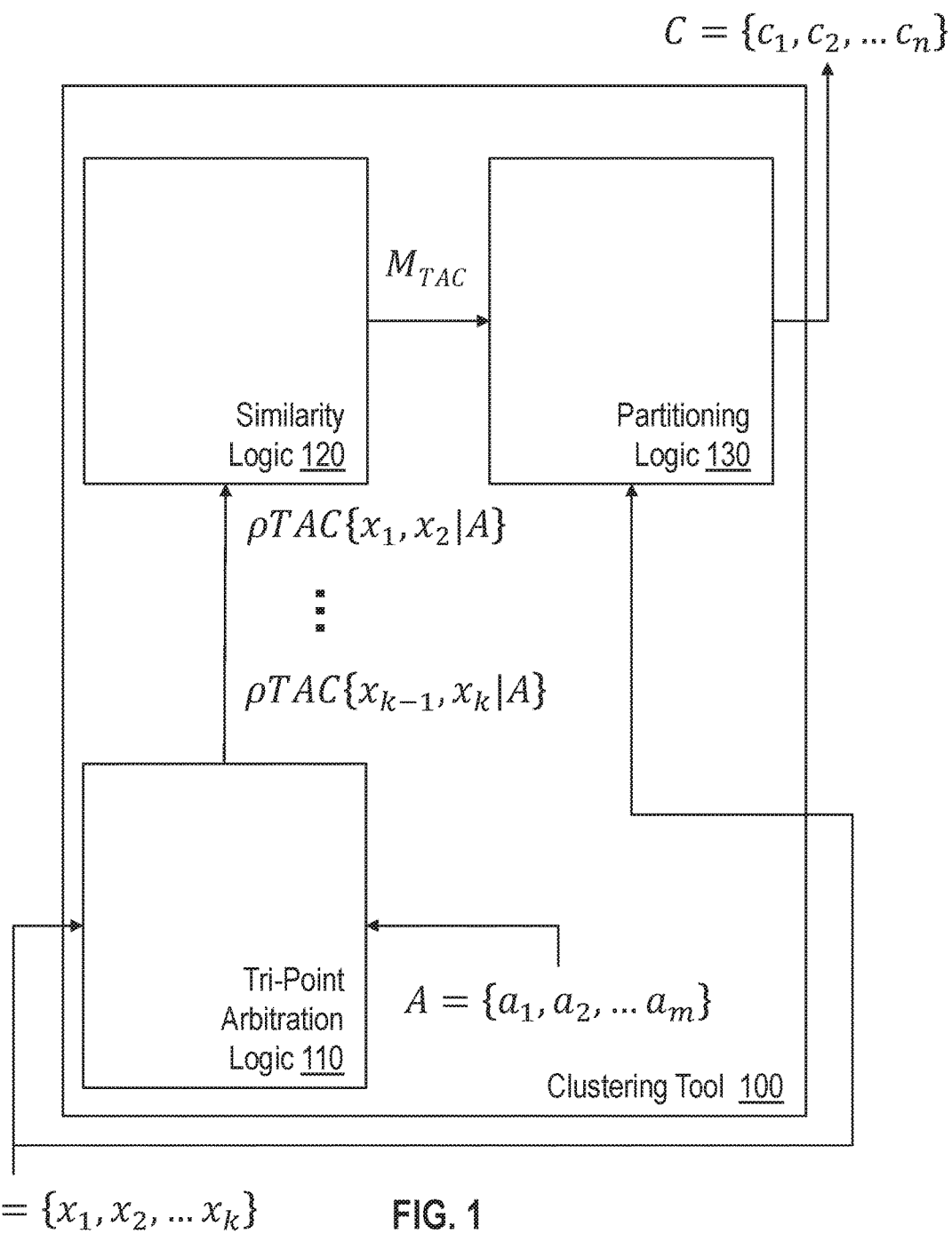
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. TRI-POINT ARBITRATION OVERVIEW
3. CLUSTER ANALYSIS USING TRI-POINT ARBITRATION
4. DISJOINT CLUSTER IDENTIFICATION
5. COMBINED K-MEANS AND SPECTRAL CLUSTERING
6. ARBITER SELECTION AND WEIGHTING
7. HARDWARE OVERVIEW
8. MISCELLANEOUS EXTENSIONS

1. General Overview

Clustering may be formulated as a multi-objective optimization problem. One objective is to determine what the "best" or final number of clusters should be for a given data set. Many clustering algorithms, such as K-means, CURE, and spectral clustering, rely on the number of expected clusters to be specified as an input. One issue with relying on the user to specify a number of clusters, is that the clustering results may not be optimal if the best number of clusters is not known in advance. For example, if a user specifies more clusters than the data naturally suggests, then the points from different clusters may not be as dissimilar as desired. If the number of clusters specified is too small, then there may be clusters containing dissimilar points. Therefore, if the optimal number of clusters is not known ahead of time, relying on the user to specify the final number of clusters may lead to unnatural or otherwise suboptimal groupings.

Another objective of clustering is to group data such that data points belonging to the same cluster are more similar to each other than they are to data points belonging to other clusters. The notion of whether a data point is more similar to one cluster than another cluster varies between different clustering algorithms. Many clustering algorithms rely on a distance measure (e.g., Euclidean, Cosine, Jaccardian, etc.) to determine whether a data point is more similar to one cluster than another cluster. For example, a Euclidean-based clustering algorithm may calculate the centroid for each cluster as the average across all data points in the cluster. A data point may be determined to be more similar to a first cluster than a second cluster if the Euclidian distance between the target data point and the centroid for the first cluster is smaller than the Euclidian distance between the target data point and the centroid for the second cluster. One deficiency to this approach is that it relies on the injection of domain knowledge to determine whether a given data point is similar to a given cluster. Generally, the domain knowledge comes in the form of user input specifying the final number of clusters. However, the domain knowledge may specify a distance threshold that indicate similarity or other parameters that define how to measure similarity.

Systems and methods are described herein that provide cluster analysis with tri-point arbitration. During cluster analysis, similarity values from a tri-point arbitration similarity matrix may be used to determine when to stop partitioning or otherwise grouping data points. This allows for an unsupervised clustering process where the number of final clusters does not need to be known or specified ahead of time. Rather, the number of final clusters and their composition is determined automatically using tri-point arbitration.

In one or more embodiments, a process for performing cluster analysis on a set of data points using tri-point arbitration comprises generating, within volatile and/or non-volatile storage of a computing device, a first cluster that includes a set of data points. The process then generates a tri-point arbitration similarity matrix by computing a set of similarity values for a plurality of data point pairs within the set of data points. Each similarity value in the set of similarity values corresponds to a respective data point pair from the plurality of data point pairs and is computed by the at least one process based, at least in part, on a distance between the respective data point pair and a set of one or more arbiter data points. The process then partitions, within volatile and/or non-volatile storage of the computing device, the first cluster into a set of two or more clusters such that each cluster of the two or more clusters includes a respective subset of data points from the first set of data points. The process then determines, based at least in part on the set of similarity values in the tri-arbitration similarity matrix, whether to partition at least one cluster of the set of two or more clusters. If the at least one cluster is partitioned, then the process may be iteratively repeated to retain the at least one cluster or continue partitioning the resultant set of clusters until it is determined, based at least in part on the set of similarity values in the tri-arbitration similarity matrix, that partitioning should stop.

2. Tri-Point Arbitration Overview

The basic building block of traditional similarity analysis in machine learning and data mining is categorizing data and their attributes into known and well-defined domains and identifying appropriate relations for handling the data and their attributes. For example, similarity analysis includes specifying equivalence, similarity, partial order relations, and so on. In trivial cases when all attributes are numeric and represented by real numbers, comparing data point attributes is done by using the standard less-than, less-than-or-equal, more-than, and more-than-or-equal relations, and comparing points by computing distances (e.g., Euclidean) between the two points. In this case, the distance between two data points serves as the measure of similarity between the data points. If the distance is large, the points are deemed dissimilar.

A matrix of pair-wise distances between all data points in a data set is a standard similarity metric that is input to a variety of data mining and machine learning tools for clustering, classification, pattern recognition, and information retrieval. Euclidean distance is one possible distance between data points for use in the pair-wise matrix. A variety of other distance-based measures may be used depending on the specific domain of the data set. However, the distance based measures used in traditional machine learning are understandably all based on two data points.

One of the deficiencies of the traditional two data point distance approach to similarity analysis is the subjectivity that is introduced into the analysis by an outside analyst. An outside analyst determines the threshold on distances that indicate similarity. This leads to non-unique outcomes which depend on the analyst's subjectivity in threshold selection.

Traditionally, a determination as to what constitutes "similarity" between data points in a data set is made by an analyst outside the data set. For example, a doctor searching for patients in a data set having "similar" age to a given patient specifies an age range in her query that, in her opinion, will retrieve patients with a similar age. However, the age range that actually represents "similar" ages depends upon the data set itself. If the data set contains patients that are all very similar in age to the given patient, the query may be over-selective, returning too many patients to effectively analyze. If the data set contains patients that have ages that have a wide variety of ages, the query may be under-selective, missing the most similar patients in the data set.

Another deficiency in the traditional two point distance approach to similarity analysis is the conceptual difficulty of combining attributes of different types into an overall similarity of objects. The patient age example refers to a data point with a single, numerical, attribute. Most machine learning is performed on data points that have hundreds of attributes, with possibly non-numerical values. Note that the analyst will introduce their own bias in each dimension, possibly missing data points that are actually similar to a target data point. Some pairs of points may be close in distance for a subset of attribute types. Thus, the analyst may miss data points that are similar to the target data point for reasons that are as yet unappreciated by the analyst. Proper selection of the similarity metric may lead to better results in the performance of clustering, classification and pattern recognition methods used to make inferences about a data set.

Systems and methods are described herein that provide similarity analysis with tri-point arbitration. Rather than determining similarity by an external analyst, tri-point arbitration determiners similarity with an internal arbiter that is representative of the data set itself. Thus, rather than expressing similarity based on distances between two points and forcing the analyst to determine a range of distances that is similar, the systems and methods herein use three points to determine similarity, thereby replacing the external analyst with an internal arbiter point that represents the data set, i.e., introducing an internal analyst into similarity determination. U.S. Pat. No. 9,147,162, entitled "Similarity Analysis with Tri-Point Data Arbitration" and U.S. application Ser. No. 13/833,757, entitled "Per-Attribute Data Clustering Using Tri-Point Data Arbitration" describe the use of tri-point arbitration in standalone cluster analysis. The systems and methods described herein may be used to integrate tri-point arbitration into various clustering algorithms, such as spectral and K-means clustering, to automatically determine how many clusters to generate.

Tri-point arbitration is realized through the introduction of an arbiter data point into the process of evaluation of two or more data points for processing attributes and attribute combinations allowing for inference about possible relationships between the data points. The term "data point" is used in the most generic sense and can represent points in a multidimensional metric space, images, sound and video streams, free texts, genome sequences, collections of structured or unstructured data of various types. The disclosed tri-point arbitration techniques uncover the intrinsic structure in a group of data points, facilitating inferences about the interrelationships among data points in a given data set or population. The disclosed tri-point arbitration techniques have extensive application in the fields of data mining, machine learning, and related fields that in the past have relied on two point distance based similarity metrics.

With reference to FIG. 1, a clustering tool 100 that generates a set of one or more clusters using tri-point arbitration is illustrated. The clustering tool 100 inputs a data set D of data points $\{x_1, \ldots, x_k\}$ and outputs a set C of clusters $\{c_1, \ldots, c_n\}$. The clustering tool 100 includes tri-point arbitration logic 110, similarity logic 120, and partitioning logic 130. The tri-point arbitration logic 110 selects a data point pair $(x_1, x_2)$ from the data set. The tri-point arbitration logic 110 also selects one or more arbiter points from a set of arbiter points, A, that is representative of the data set. Various examples of sets of arbiter points will be described in more detail below.

The tri-point arbitration logic 110 calculates a tri-point arbitration coefficient for the data point pair based, at least in part, on a distance between the first and second data points and the selected arbiter point $a_1$. The tri-point arbitration logic 110 calculates additional respective tri-point arbitration coefficients for the data point pair $(x_1, x_2)$ based on respective arbiter points $(a_2\text{-}a_m)$. The tri-point arbitration coefficients for the data pair are combined in a selected manner to create an aggregate tri-point arbitration coefficient for the data pair. The aggregate tri-point arbitration coefficient for the data point pair, denoted $\rho TAC(x_1, x_2|A)$, is provided to the similarity logic 120. The tri-point arbitration logic 110 computes aggregate tri-point arbitration coefficients for the other data point pairs in the data set and also provides those tri-point arbitration coefficients to the similarity logic 120.

Figure 2:
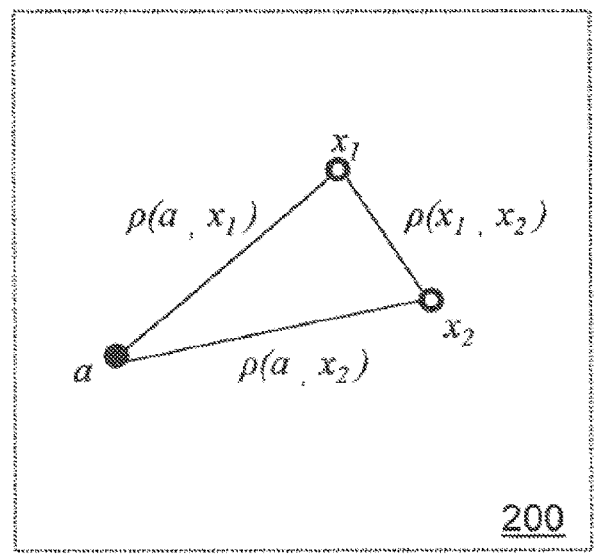
FIG. 2 illustrates an example computation of a tri-point arbitration coefficient in accordance with one or more embodiments.

FIG. 2 illustrates one embodiment of a tri-point arbitration technique that may be used by the tri-point arbitration logic 110 to compute the tri-point arbitration coefficient. A plot 200 illustrates a spatial relationship between the data points in the data point pair $(x_1, x_2)$ and an arbiter point a. Recall that the data points and arbiter point may have many more dimensions than the two shown in the simple example plot 200. The data points and arbiter points may be points or sets in multi-dimensional metric spaces, time series, or other collections of temporal nature, free text descriptions, and various transformations of these. A tri-point arbitration coefficient for data points $(x_1, x_2)$ with respect to arbiter point a is calculated as shown in 210, where $\rho$ designates a two-point distance determined according to any appropriate technique:

$$\rho TAC(x_i, x_j | a) = \frac{\min\{\rho(x_i, a), \rho(x_j, a)\} - \rho(x_i, x_j)}{\max\{\rho(x_i, x_j), \min\{\rho(x_i, a), \rho(x_j, a)\}\}}$$

Thus, the tri-point arbitration technique illustrated in FIG. 2 calculates the tri-point arbitration coefficient based on a first distance between the first and second data points, a second distance between the arbiter point and the first data point, and a third distance between the arbiter point and the second data point.

Values for the tri-point arbitration coefficient for a single arbiter point, $\rho TAC(x_i, x_j|a)$, ranges from $-1$ to $1$. In terms of similarities, $\rho TAC(x_i, x_j|a) > 0$ when both distances from the arbiter to either data point are greater than the distance between the data points. In this situation, the data points are closer to each other than to the arbiter. Thus a positive tri-point arbitration coefficient indicates similarity, and the magnitude of the positive coefficient indicates a level of similarity. $\rho TAC(x_i, x_j|a) = +1$ indicates a highest level of similarity, where the two data points are coincident with one another.

In terms of dissimilarity, $\rho TAC(x_i, x_j|a) < 0$ results when the distance between the arbiter and one of the data points is less than the distance between the data points. In this situation, the arbiter is closer to one of the data points than the data points are to each other. Thus a negative tri-point arbitration coefficient indicates dissimilarity, and the magnitude of the negative coefficient indicates a level of dissimilarity. $\rho TAC(x_i, x_j|a) = -1$ indicates a complete dissimilarity between the data points, when the arbiter coincides with one of the data points.

A tri-point arbitration coefficient equal to zero results when the arbiter and data points are equidistant from one another. Thus $\rho TAC(x_i, x_j|a) = 0$ designates complete indifference with respect to the arbiter point, meaning that the arbiter point cannot determine whether the points in the data point pair are similar or dissimilar.

Returning to FIG. 1, the similarity logic 120 determines a similarity metric for the data set based, at least in part, on the aggregate tri-point arbitration coefficients for the data point pairs, in one embodiment, the similarity metric is a pair-wise matrix. MTAC of tri-point arbitration coefficients using the empirical formulation:

$$MTAC = \begin{matrix} \rho ETAC(x_1, x_1 | A) & \ldots & \rho ETAC(x_1, x_k | A) \\ \rho ETAC(x_2, x_1 | A) & \ldots & \rho ETAC(x_2, x_k | A) \\ \ldots & & \\ \rho ETAC(x_k, x_1 | A) & \ldots & \rho ETAC(x_k, x_k | A) \end{matrix}$$

The illustrated pair-wise MTAC matrix arranges the aggregate tri-point arbitration coefficient for the data points in rows and columns where rows have a common first data point and columns have a common second data point. When searching for data points that are similar to a target data point within the data set, either the row or column for the target data point will contain tri-point arbitration coefficients for the other data points with respect to the target data point. High positive coefficients in either the target data point's row or column may be identified to determine the most similar data points to the target data point. Further, the pair-wise MTAC matrix can be used for any number of learning applications, including clustering and classification based on the traditional matrix of pair-wise distances. The matrix may also be used as the proxy for similarity/dissimilarity of the pairs.

As already discussed above, the arbitration point(s) represent the data set rather than an external analyst. There are several ways in which a set of arbitration points may be selected that represents the data set. The set of arbitration points A may represent the data set based on an empirical observation of the data set. For example, the set of arbitration points may include all points in the data set other than the data point pair for which the coefficient is being generated. The set of arbitration points may include selected data points that are weighted when combined to reflect a contribution of the data point to the overall data set. The aggregate tri-point arbitration coefficient calculated based on a set of arbitration points that are an empirical representation of the data set (denoted $\rho ETAC(x_i, x_j|A)$) may be calculated as follows:

$$\rho ETAC(x_i, x_j \mid A) =$$

$$\begin{cases} \dfrac{1}{m}\sum_{k=1}^{m} \rho TAC(x_i, x_j \mid a_k), & \text{if } i \ne j \text{ and where } a \notin \{x_i, x_j\} \\ 1, & \text{if } i = j \end{cases}$$

Variations of aggregation of arbitration points including various weighting schemes may be used. Other examples of aggregation may include majority/minority voting, computing median, and so on.

For a known or estimated probability distribution of data points in the data set, the set of arbitration points corresponds to the probability distribution, f(a). The aggregate tri-point arbitration coefficient calculated based on the probability distribution (denoted ρPTAC) may be calculated as follows:

$$\rho PTAC(x_i, x_j \mid f(a)) = \int_{lo}^{hi} \rho TAC(x_i, x_j \mid a) f(a) da$$

Thus, the tri-point arbitration coefficient can be calculated using an empirical observation of the data point values in the data set, an estimated distribution of the data point values in the data set or an actual distribution of data point values in the data set.

Figure 3:
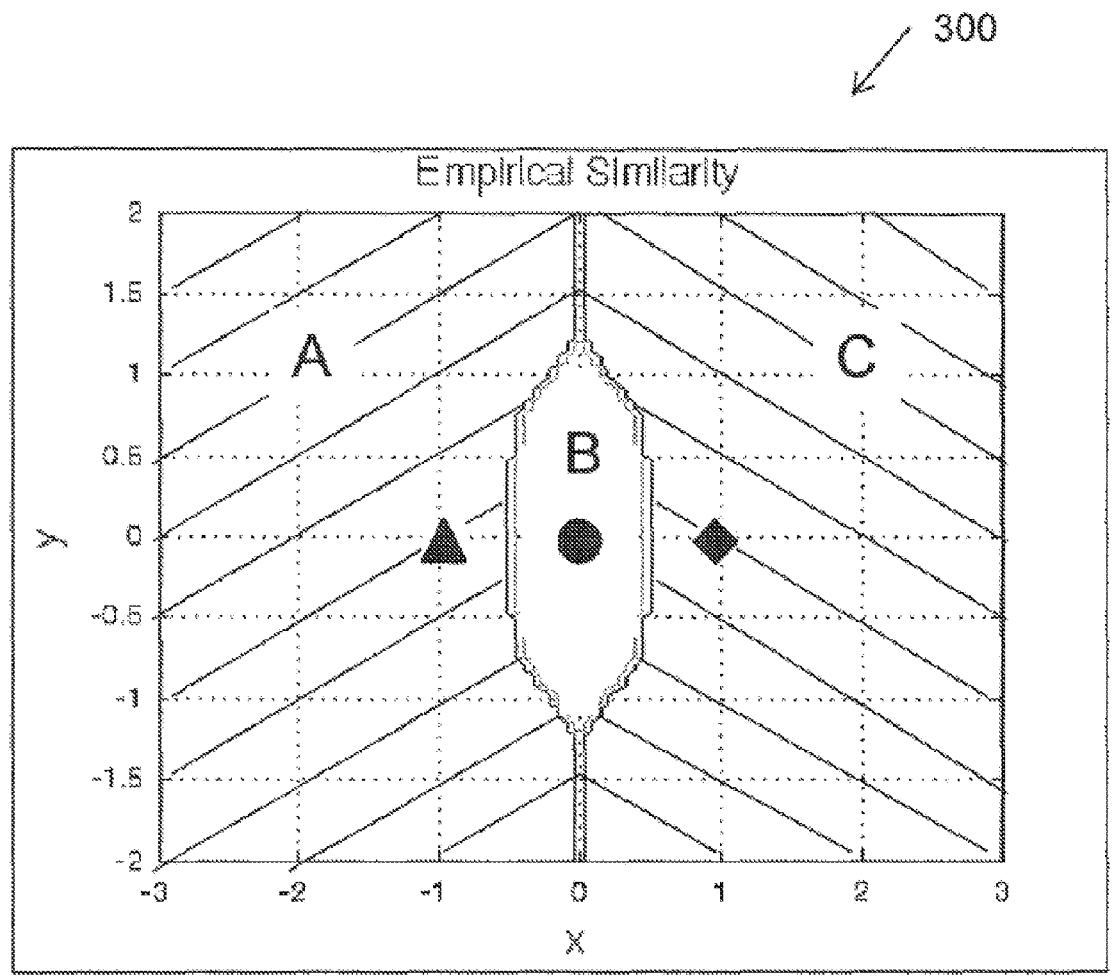
FIG. 3 illustrates a similarity metric that classifies data points based on similarity in accordance with one or more embodiments.

Using tri-point arbitration with an arbiter point that represents the data set yields more appealing and practical similarity results than using a tradition two point distance approach. FIG. 3 graphically illustrates a similarity metric 300 that classifies data points as being more similar to either triangle (coordinates −1,0), circle (coordinates 0,0), or diamond (coordinates 1,0). Analysis begins by considering all possible pairs of points {triangle, x} using the other two as a set of analysts: A\triangle={diamond, circle}. The corresponding ρETAC(triangle, x|A\triangle) are computed. The same procedure is repeated for all pairs {diamond, x} and A\diamond={triangle, circle} and for the circle. All points for which ρETAC(diamond, x)>max(ρETAC(triangle, x), pETAC(circle, x)) are marked as points similar to diamond. And similarly points similar to triangle and circle are marked.

The resulting structuring is presented in FIG. 3. All points lying in the // hashed region A are similar to the triangle point. All points lying in \\ hashed region C are similar to the diamond point. All points within the un-hashed region B are similar to the circle point. Note that there are regions in which distance-wise points may be closer to the "circle" point but are actually more similar to triangle or diamond. Given a query point q one finds the most similar object from the data set {"red", "green", "blue"} by determining in which region the point q falls.

Returning to FIG. 1, the partitioning logic 120 receives the set of data points {$x_1, \ldots, x_k$} and the tri-point arbitration similarity matrix MTAC. Based, at least in part on the aggregate tri-point arbitration coefficients within matrix MTAC, the partitioning logic 120 produces a set of clusters C={$c_1 \ldots c_n$} where each cluster in C includes one or more data points from the data set D.

To obtain the final set of clusters C, the partitioning logic 120 starts with a single cluster that includes all data points {$x_1, \ldots, x_k$}. The partitioning logic 120 then analyzes the cluster to identify disjoint or dissimilar groups of data points and splits the single cluster into a plurality of clusters. The partitioning logic 120 may continue to iteratively partition the plurality of clusters to generate smaller clusters until the final set of clusters C is generated. In one or more embodiments, the partitioning logic 120 determines when to stop partitioning and how many clusters to generate based, at least in part, on the tri-point arbitration similarity matrix MTAC. Example logic for performing partitioning is provided in further detail below.

Figure 4:
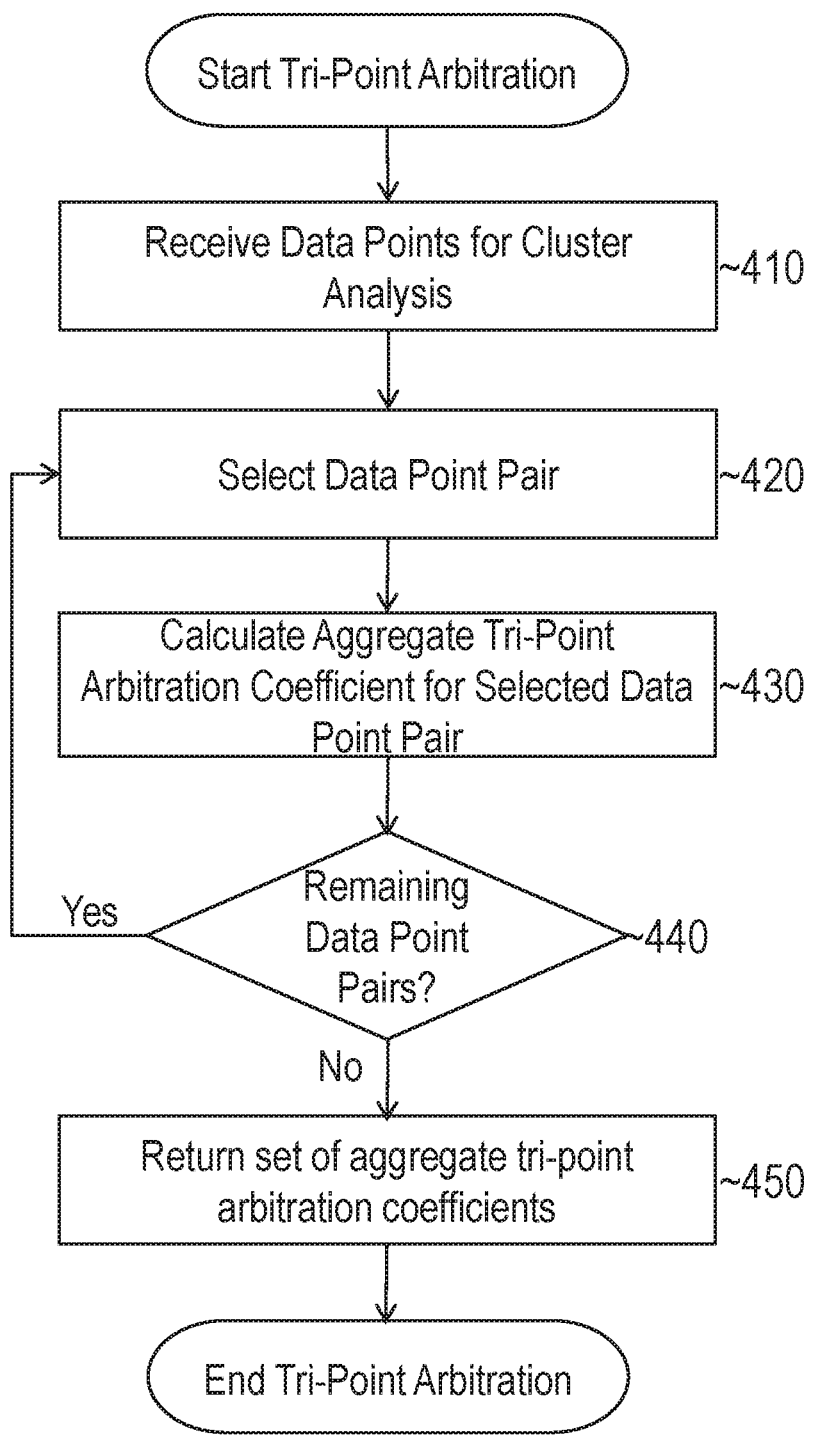
FIG. 4 illustrates an example process for generating a tri-point arbitration similarity matrix according to one or more embodiments.

FIG. 4 illustrates an example process for generating a tri-point arbitration similarity matrix according to one or more embodiments. The process includes, at 410, receiving a set of data points for which to generate the tri-point arbitration similarity matrix. The process includes, at 420, selecting a data point pair including a first data point and a second data point from the set of data points. The process includes at 430, computing a similarity value for the selected data point pair, where the similarity value is the aggregate tri-arbitration coefficient. The set of arbiters used to compute the similarity value may be all other data points in the set of data points other than the data point pair or some subset thereof as previously described. At 440, the process determines whether there are remaining data point pairs with the data set for which a similarity value has not yet been computed. If so, then the process returns to 420, and one of the remaining data point pairs is selected. Otherwise, the process continues to 450, and the set of similarity values computed for the selected data point pairs is returned. The set of similarity values may be used to determine whether to continue partitioning the set of data points and, if so, how to partition the set of data points as described further below.

3. Cluster Analysis Using Tri-Point Arbitration

Partition-based clustering algorithms begin with a large cluster of data points and divide the large data cluster into two or more smaller clusters. Generally, the number of partitions that are made is determined based on external input from a user specifying the final number of clusters. For instance, if the user input indicates that five clusters should be generated, then four partitions may be made based on pre-defined partitioning criteria. As previously indicated, relying on the user to specify the final number of clusters may lead to unnatural or otherwise suboptimal groupings in certain circumstances.

Instead of relying on extrinsic input to determine the final number of clusters, tri-point arbitration may be used to determine when to stop partitioning a data set. In other words, tri-point arbitration allows for an unsupervised learning process through which an optimal number of clusters may be determined automatically. Partition-based clustering algorithms may use tri-point arbitration to compare the similarity of two separate clusters. If it is determined, based on the tri-point arbitration similarity values, that the clusters are not similar, then partitioning may continue. Conversely, if the clusters are similar, then the clusters may be merged and the partitioning may stop.

Figure 5:
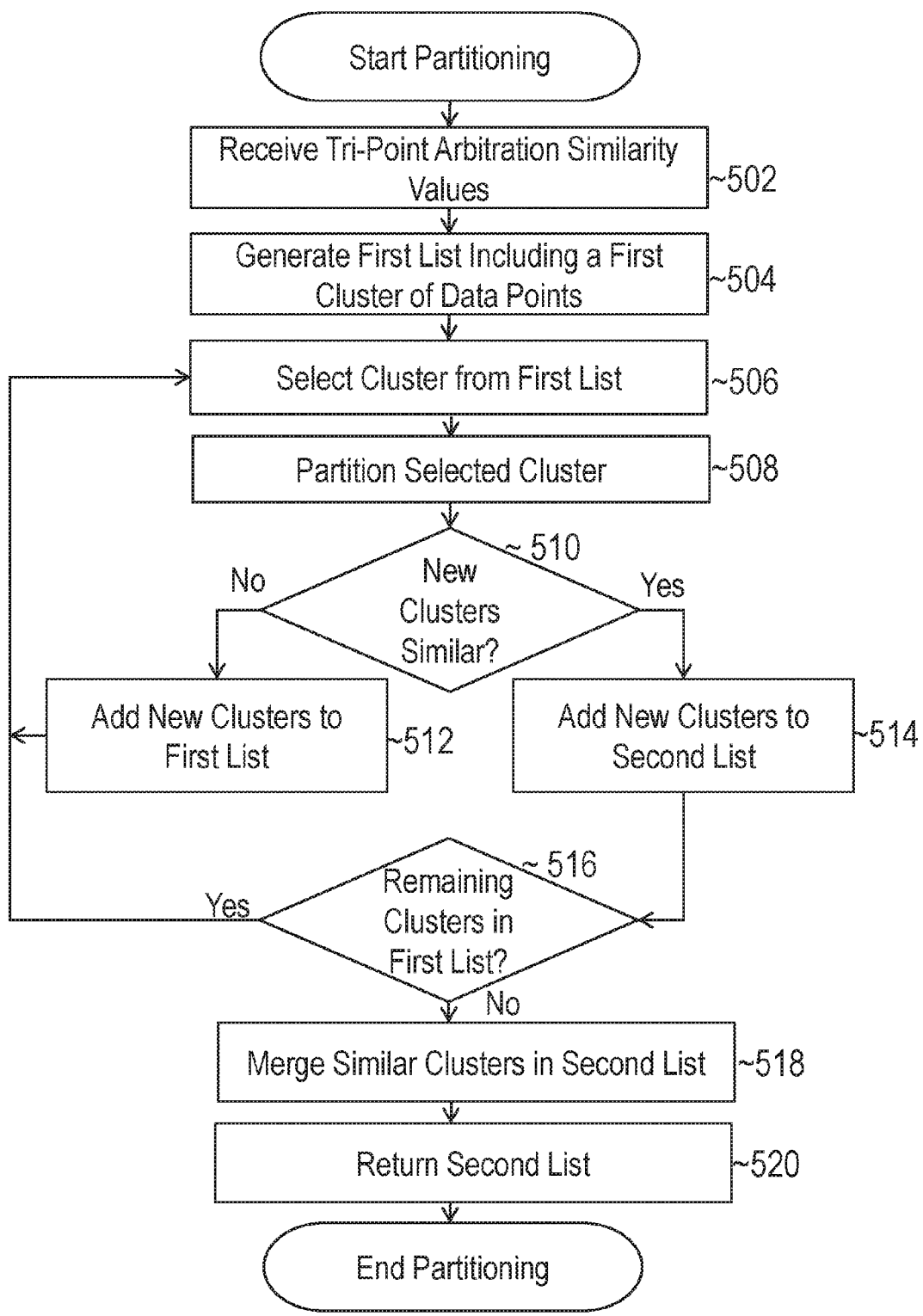
FIG. 5 illustrates an example process that uses tri-point arbitration to determine when to stop partitioning clusters of data points, according to one or more embodiments.

FIG. 5 illustrates an example process that uses tri-point arbitration to determine when to stop partitioning clusters of data points, according to one or more embodiments. The process, at 502, includes receiving a set of tri-point arbitration similarity values. For example, the process may receive the tri-point arbitration similarity matrix MTAC for a set of data points to be clustered. As previously indicated, a similarity value within MTAC may be an aggregate tri-point arbitration coefficient that is computed based, at least in part, on a distance between a respective data point pair and a set of one or more arbiter data points, which may be other data points in the cluster other than the data points belonging to the respective data point pair. Each value $t_{i,j}$ in the similarity matrix may be formulated as follows:

$$t_{i,j} = \begin{cases} \dfrac{1}{n-2} \sum_{a \notin \{x_i, x_j\}} \rho TAC(x_i, x_j \mid a), & \text{if } i \neq j \\ 1, & \text{if } i = j \end{cases}$$

where i represents a row number in the similarity matrix for a row corresponding to data point $x_i$, j represents a column number in the similarity matrix for a column corresponding to data point $x_j$, a is the selected arbiter data point, and n is the number of data points in the cluster.

At 504, the process generates, within volatile and/or non-volatile memory, a first list, referred to herein as "currentClusters", that includes one cluster with the data points $\{x_1, \ldots, x_k\}$ from data set D. A list is said to "include" a cluster if the list includes data that identifies the cluster and the data points that belong to the cluster. A list may be generated using one or more data structures such as linked lists, hash tables, arrays, trees, etc.

At 506, the process selects a cluster from currentClusters. Initially, a first cluster having all the data points $\{x_1, \ldots, x_k\}$ is selected. However, the process may add new clusters to this list during partitioning per the steps described below. The process may iteratively partition data points $\{x_1, \ldots, x_k\}$ until it is determined, based at least in part on similarity values from MTAC, that no new clusters should be generated.

At 508, the process partitions the selected cluster into two new clusters. Each of the new clusters includes a subset of the data points from the selected cluster and, thus, is smaller than the selected cluster. Any partitioning algorithm may be used to divide the data points into the two new clusters. In one or more embodiments, partitioning is performed based at least in part on similarity values from the tri-point arbitration similarity matrix. Examples for identifying disjoint clusters using the tri-point arbitration similarity matrix are provided in further detail in the section below.

At 510, the process determines, based on the tri-point arbitration similarity values, whether the two new clusters are similar to each other. The manner in which similarity is determined using the similarity values may vary depending on the particular implementation. In one or more embodiments, two or more partitions are determined to be similar if the sum of the aggregate tri-point arbitration coefficients between each point in the two clusters is greater than zero. Similarity may thus be formulated as follows:

$$\text{If } \sum_{i \in C_1, j \in C_2} t_{i,j} > 0 \text{ then } C_1 \text{ is similar to } C_2$$

In other words, if the sum of the similarity values for each data point pair between the two clusters is greater than zero, then partitioning is stopped for the selected cluster.

Another option for determining if clusters are similar is a counting approach. Rather than summing the magnitudes of the similarity values, this approach counts the number of data point pairs (one data point chosen from each cluster) that are similar and determines that the clusters are similar if a threshold number of data point pairs are similar. Similarity according to this approach may be formulated as follows:

$$s_{i,j} = \begin{cases} -1, & \text{if } t_{i,j} < 0 \\ 0, & \text{if } t_{i,j} = 0 \\ 1, & \text{if } t_{i,j} > 0 \end{cases}$$

$$\text{If } \sum_{i \in C_1, j \in C_2} s_{i,j} > 0 \text{ then } C_1 \text{ is similar to } C_2$$

In other words, the two clusters are determined to be similar if there are more positive similarity values than negative similarity values for each data point pair in the two clusters.

If the two new clusters are not similar, then, at 512, the process adds the two new clusters to the currentClusters list. The process then returns to 506 and repeats partitioning on the two new clusters. Thus each cluster may be iteratively partitioned into smaller clusters until tri-arbitration indicates that the newly generated clusters are similar.

If the two new clusters are similar, then, at 514, the process adds the two new cluster to a second list referred to herein as "finalClusters". This list identifies the cluster of data points for which partitioning has stopped. In an alternative embodiment, the original cluster may be added to finalClusters rather than the two new clusters.

The process includes, at 516, determining whether there are any remaining clusters in the currentClusters list. If any clusters remain, then the process returns to 506 and selects another cluster from the list for partitioning. Once there are no remaining clusters on the currentClusters list, then the process proceeds to 518.

At 518, the process merges similar clusters, if any, on the finalClusters list. For instance, if cluster A is partitioned into clusters B and C, and it is determined based on the tri-point arbitration similarity values that B and C are similar, then the parent cluster A is maintained and returned as one of the final clusters. Thus, clusters B and C are merged together to reproduce A, effectively removing B and C from the final set of clusters. There may be multiple instances of similar clusters within the finalClusters list depending on how many partitions were made. Thus, the number of merges that are performed may vary from implementation to implementation. In an alternative embodiment, the original cluster A is added to the second list if B and C are similar rather than adding clusters B and C to the list. In this case, the process may skip the merging step.

At 520, the process returns the finalClusters list, which identifies the final set of clusters $\{c_1, \ldots, c_n\}$ including the data points that belong to each cluster.

The examples provided above involve using tri-point arbitration to determine when to stop partitioning clusters. In one or more other embodiments, tri-point arbitration may be used in an agglomerative cluster analysis. With agglomerative cluster analysis, each individual data point is treated as its own cluster. The process may iteratively join clusters that are determined to be similar. Agglomeration may stop once it is determined, using the tri-point arbitration similarity values, that the different clusters are not similar. Thus, tri-point arbitration may be used to determine when to stop agglomerating or partitioning clusters. Stated more generally, tri-point arbitration may be used to automatically determine the final number of clusters for a variety of clustering algorithms.

The final set of clusters may be analyzed by one or more computing devices to generate and output a set of analytic results. The analytic results that are generated may vary from implementation to implementation. Examples may include, without limitation, descriptions, summaries, visualizations, classifications, segmentations, recommendations, alerts, indexing, and modelling. The results may be generated based on an analysis of the clusters rather than an analysis of the individual data points.

In one or more embodiments, the process may apply the clustering process to a set of weekly time-series data to group similar days, hours, and/or other sub-periods of time that recur within a week. For instance, the process may cluster sub-periods based on observed resource usage patterns. One cluster may classify sub-periods as sparse highs, another may classify sub-periods that are dense highs, and another may classify sub-periods as lows.

In one or more embodiments, the process analyzes cluster-specific data that represents one or more clusters from the final set of clusters. Cluster-specific data may comprise any data that defines or otherwise identifies a characteristic of a particular cluster or of group of clusters. Example cluster-specific data may include data that identifies common patterns, measures, or other attributes for the data points that belong to a given cluster. For instance, a cluster may group metrics that are related to each other in some way. Thus, performance metrics such as processor usage, memory bandwidth, I/O requests, etc. may be normalized and grouped together. Normalization of the data may assign values to the various metrics to compare different metrics to each other. The data points may be clustered based on comparing the tri-point arbitration similarity values such as described above. In the same or a different embodiment, the cluster-specific data may select one or more metrics, values, or subsets of data points that belong to a given cluster as representative of the given cluster. For instance, the cluster-specific data may include a data set or one or more data points representative of unusually high resource usage, another representative of normal resource usage, and another representative of unusually low resource usage. In another example, the cluster-specific data may comprise an aggregation (e.g., an average, sum, etc.) of data points from a particular cluster or from a set of clusters. Thus, the cluster-specific data that is analyzed may vary depending on the particular implementation.

4. Disjoint Cluster Identification

Cluster analysis may use a variety of techniques to determine how to partition data into a final set of clusters. With standard spectral clustering, the eigenvector corresponding to the second-smallest eigenvalue from the symmetric normalized Laplacian of a similarity matrix is used to partition data points into two separate clusters. Using the second smallest eigenvalue minimizes the number of edges between data points that are cut. However, cutting only based on the second smallest eigenvalue may also increase the number of partitioning steps needed to reach an optimal number of clusters in the case where there are multiple disjoint clusters in the data set.

According to one or more embodiments, disjoint clusters are identified based, at least in part, on one or more eigenvectors from a Laplacian of the tri-point arbitration similarity matrix. Rather than using the eigenvector associated with the second-smallest eigenvalue by default, the process may identify how many zero eigenvalues exist in the associated Laplacian matrix. If there are multiple zero eigenvalues, then the corresponding eigenvectors may be used to determine the disjoint clusters. For cases where there are disjoint clusters, this approach may reduce the number of partitions that are performed, thereby saving time and computational cost.

Figure 6:
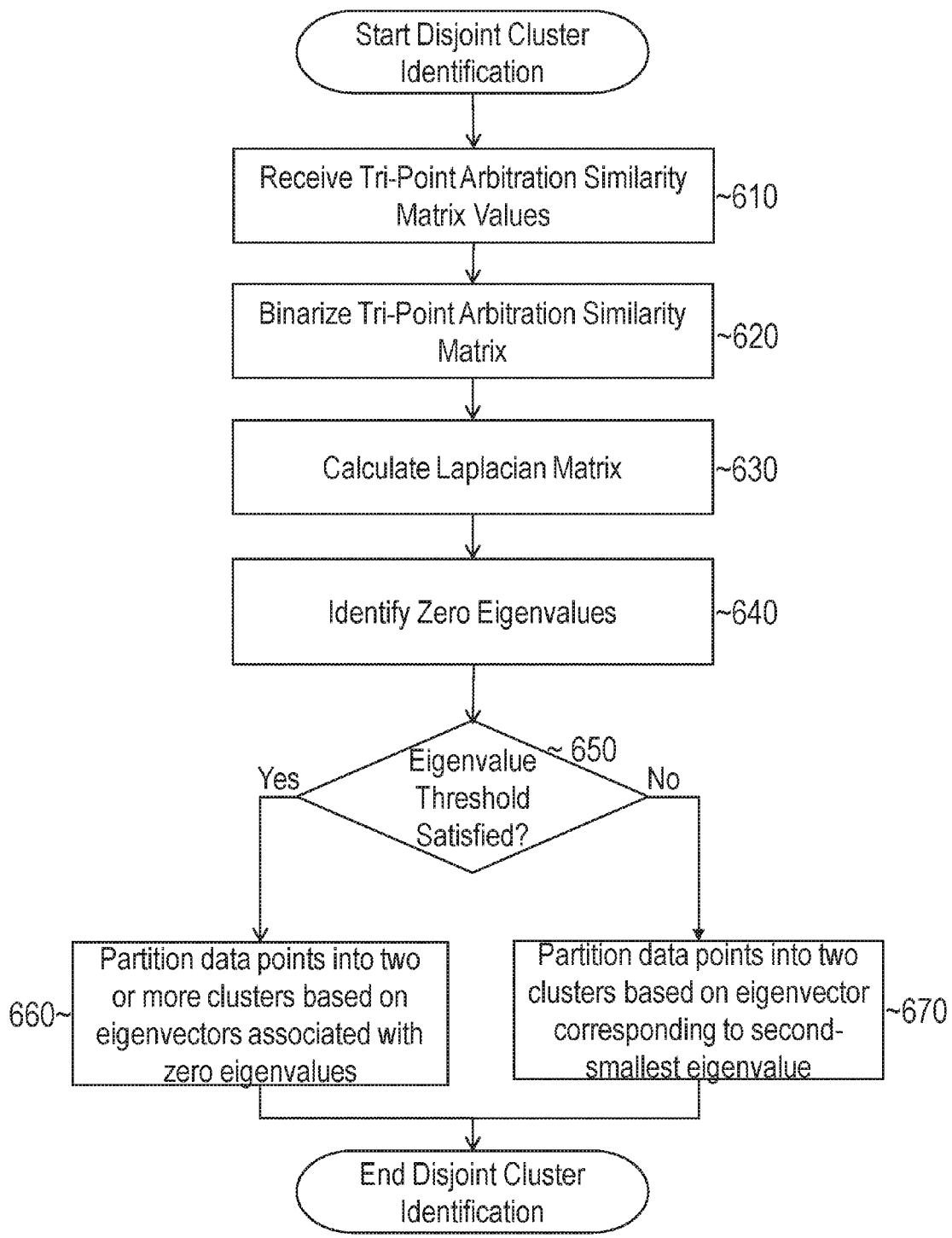
FIG. 6 illustrates an example process that uses tri-point arbitration similarity values to determine how to partition a set of data points, according to one or more embodiments.

FIG. 6 illustrates an example process that uses tri-point arbitration similarity values to determine how to partition a set of data points, according to one or more embodiments. The process includes, at 610, receiving a similarity matrix, which may be the tri-point arbitration similarity matrix MTAC.

At 620, the process binarizes the tri-point arbitration similarity matrix. Binarizing the tri-point arbitration similarity matrix involves converting the similarity matrix into a binary version where each matrix element is chosen from a set of two values. For example, negative values may be converted to zero and positive values may be converted to one. Thus, the conversion may result in a binary version where all matrix elements are non-negative, which may be useful for certain spectral operations.

At 630, the process calculates a Laplacian matrix for the tri-point arbitration similarity matrix. The Laplacian matrix may be computed as follows:

$$L = D - \text{MTAC}$$

where $D = \text{diag}(\text{sum}(\text{MTAC}(1,:)), \text{sum}(\text{MTAC}(2,:)), \ldots, \text{sum}(\text{MTAC}(n,:))))$ and MTAC is the tri-point arbitration similarity matrix (which serves as the adjacency matrix in this example). In other embodiments, a symmetric normalized Laplacian matrix, random-walk normalized Laplacian matrix or some other Laplacian may be calculated. The Laplacian normalizes the data for purposes of identifying disjoint clusters within the set of data.

At 640, the process identifies the zero eigenvalues within the Laplacian matrix.

At 650, the process determines whether the number of identified zero eigenvalues satisfies a threshold. For example, if there are more than one zero eigenvalues, then it is indicative that there are different sets of data points that are not connected. Thus, the associated eigenvectors may be used to identify disjoint clusters.

If number of zero eigenvalues satisfies the threshold, then, at 660, the process partitions data points into two or more clusters based on the associated eigenvectors. Otherwise, at 670, the process partitions the data points into two clusters based on the eigenvector corresponding to the second smallest eigenvalue to minimize the number of links between nodes that are cut. The manner in which the data points are partitioned based on the eigenvectors may vary depending on the particular implementation. As an example the data points are partitioned into two groups based on the sign of the second eigenvector components. Data points corresponding to the positives values of the second eigenvector are placed in one group and points corresponding to the negative values are placed in the second group for optimal split when only the first eigenvalue is zero and all other eigenvalues are non-zero. For a clean split, when more than one eigenvalue is zero, the process may use eigenvectors corresponding to the zero eigenvalues to partition the data points into groups. Each eigenvector corresponding to a zero eigenvalue codes a clean split into two groups by positive and negative values.

Figure 7:
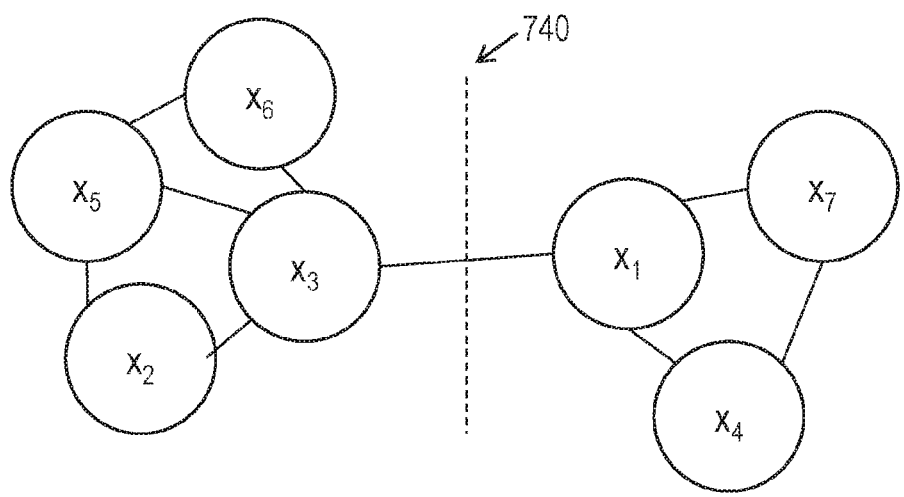
FIG. 7 illustrates an example graph partition that is performed based on a set of tri-point arbitration similarity values, according to one or more embodiments.

FIG. 7 illustrates an example graph partition that is performed based on a set of tri-point arbitration similarity values. Tri-point arbitration similarity matrix 700 depicts a seven by seven matrix that includes the set of tri-point similarity values for a cluster of seven data points $\{x_1, x_2, x_3, x_4, x_5, x_6, x_7\}$. The cluster of data points is also depicted in the form of a graph $G=(V,E)$, with V vertices (or nodes) and E edges. Each vertex corresponds to a different data point in the cluster, and each edge connects two vertices where the tri-point arbitration similarity value is greater than zero (indicating that the data points are similar). The eigenvalues of the Laplacian for tri-point arbitration similarity matrix 700 may be computed, and partition 740 may be made to divide the data points into two separate clusters: a first cluster that includes $\{x_2, x_3, x_5, x_6\}$ and a second cluster that includes $\{x_1, x_4, x_7\}$. During partitioning, the tri-point arbitration similarity matrix 700 may also be split into two separate matrices, as represented by matrix 710 and matrix 720. Matrix 710 includes the tri-point arbitration similarity values for data point pairs in the first cluster, and matrix 720 includes the tri-point arbitration similarity values for data point pairs in the second cluster. In an embodiment where partitioning continues, matrix 710 and 720 may be used to determine how to further split the data points in the first and/or second cluster. For instance, the eigenvalues of the Laplacian for matrix 710 may be computed and data points may be split into separate clusters as previously described. Thus, the similarity matrix may be iteratively partitioned and the eigenvalue recomputed for each new similarity matrix until it is determined that partitioning should stop.

5. Combined K-Means and Spectral Clustering

Some data sets may have a relatively large number of data points hundreds of thousands or millions) to cluster. In such instances, generating an n×n tri-point arbitration similarity matrix, where n represents the number of data points in a data set, and performing spectral clustering may be computationally expensive. In order to improve scalability, K-means clustering may be performed to determine an initial set of clusters for the data points. The tri-point arbitration similarity matrix may then be built using the centroids for each of the K-means clusters, where each similarity value indicates a similarity between two cluster centroids and is computed based at least in part, on the distance between the respective centroid pair and a set of one or more arbiter data points. The arbiters in this case may be all the K-means centroids (other than the centroid pair) or some subset thereof. The clustering techniques previously described may then be performed on the set of tri-point similarity values computed using the cluster centroids.

Figure 8:
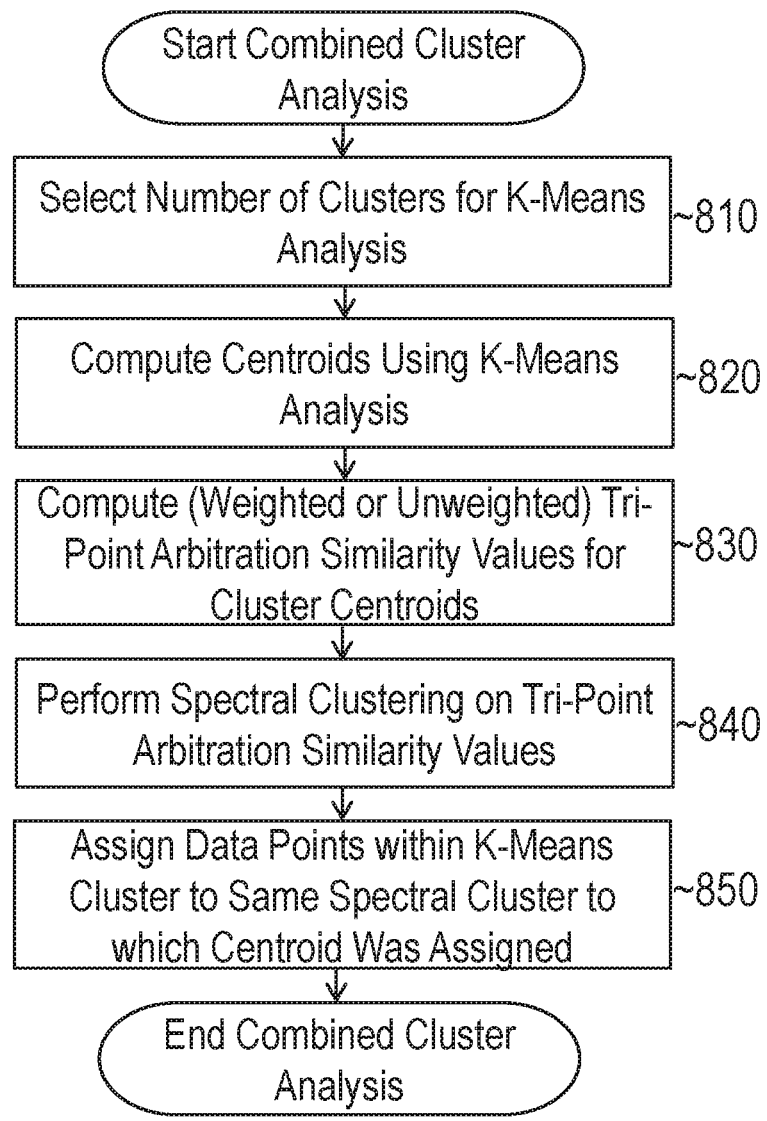
FIG. 8 illustrates an example process that performs spectral clustering using a set of tri-point similarity values for a set of cluster centroids, according to one or more embodiments.

FIG. 8 illustrates an example process that performs spectral clustering using a set of tri-point similarity values for a set of cluster centroids, according to one or more embodiments. At block 810, the number of clusters k, is selected for K-means analysis. The number of clusters generated by the K-means analysis may be selected such that it is significantly larger than the expected final number of clusters. This reduces the likelihood of two dissimilar groups of data points being assigned to the same final cluster.

At block 820, k cluster centroids are computed using a K-means clustering algorithm. For instance, the process may assign each data point to one of the k clusters whose mean yields the least within-cluster sum of squares. With each new assignment, the centroid for the cluster may be updated as an average of all data points within the cluster.

At block 830, the process computes a set of tri-point similarity values for the cluster centroids. The set of tri-point similarity values may be a k×k similarity matrix where k equals the number of centroids and the set of similarity values are computed according to $\rho ETAC(x_i, x_j|A)$ as formulated above, where $x_i$ represents a first cluster centroid, $x_j$ represents a second cluster centroid and A represents a set of arbiters. The set of arbiters in this example may be other centroids that were computed using K-means analysis.

In one or more embodiments, the similarity values may be weighted based, at least in part, on how many data points are within a K-means cluster represented by a cluster centroid. For instance, each value $t_{i,j}$ in the similarity matrix may be formulated as follows:

$$t_{i,j} = \begin{cases} \frac{1}{\sum_{a\notin\{x_i,x_j\}} n_a} \sum_{a\notin\{x_i,x_j\}} \rho TAC(x_i, x_j \mid a) * n_a, & \text{if } i \neq j \\ 1, & \text{if } i = j \end{cases}$$

where $n_a$ is the weight for each cluster centroid. The weights may be chosen such that the similarity is influenced by the other cluster centroids by an amount proportional to the number of members in each cluster. For instance, the more data points within a cluster, the greater the weight that is given to the cluster centroid. The weighting simulates what similarities would look like if the tri-point arbitration similarity values had been computed and used to cluster all the data points rather than the cluster centroids. In other words, the similarity function may compare cluster centroids while taking into account the density (number of samples) in the cluster.

At block 840, the process performs spectral clustering using the tri-point arbitration similarity values for the cluster centroids. The process may determine when to stop partitioning the centroids automatically based on the techniques described above. Once spectral clustering a complete, each spectral cluster includes one or more cluster centroids from the set of K-means clusters.

At block 850, the process assigns data points within each K-means cluster to the same spectral cluster to which the K-means cluster centroid was assigned. For instance, if $\{x_2, x_3, x_5, x_6\}$ correspond to cluster centroids and are assigned to a particular spectral cluster, then data points from each of the four K-means cluster are also assigned to the spectral cluster. The final set of spectral clusters is then returned.

6. Arbiter Selection and Weighting

The data points that are used as arbiters may vary depending on the particular implementation. As previously indicated, all other data points within a cluster may serve as arbiters or some subset thereof. In the case where a subset are used, the values within the tri-point arbitration similarity matrix may be formulated as follows:

$$t_{i,j} = \begin{cases} \frac{1}{|a : a \in A, a \neq x_i, a \neq x_j|} \sum_{a\notin\{x_i,x_j\}} \rho TAC(x_i, x_j \mid a), & \text{if } i \neq j \\ 1, & \text{if } i = j \end{cases}$$

Arbiters may be selected randomly or according to any other method.

For the case where the data points are weighted (as in the case where the data points are the K means cluster centroids, with different numbers of data points), then the probability of selecting each data point as an arbiter can depend on the weight. Below, $p_i$ is the probability of choosing data point i, out of n data points, and $w_i$ is the weight for data point i:

$$p_i = \frac{w_i}{\sum_{j=1}^{n} w_j}.$$

In such instances, calculating the tri-point arbitration similarity value $t_{i,j}$ between two data points $x_i$ and $x_j$ may be formulated as follows:

$$t_{i,j} = \begin{cases} \dfrac{1}{\sum_{a \in A, a \notin \{x_i, x_j\}} n_a} \sum_{a \notin \{x_i, x_j\}} pTAC(x_i, x_j \mid a) * n_a, & \text{if } i \neq j \\ 1, & \text{if } i = j \end{cases}$$

where the weight of each data point is $n_a$ and A is the set of arbiters.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
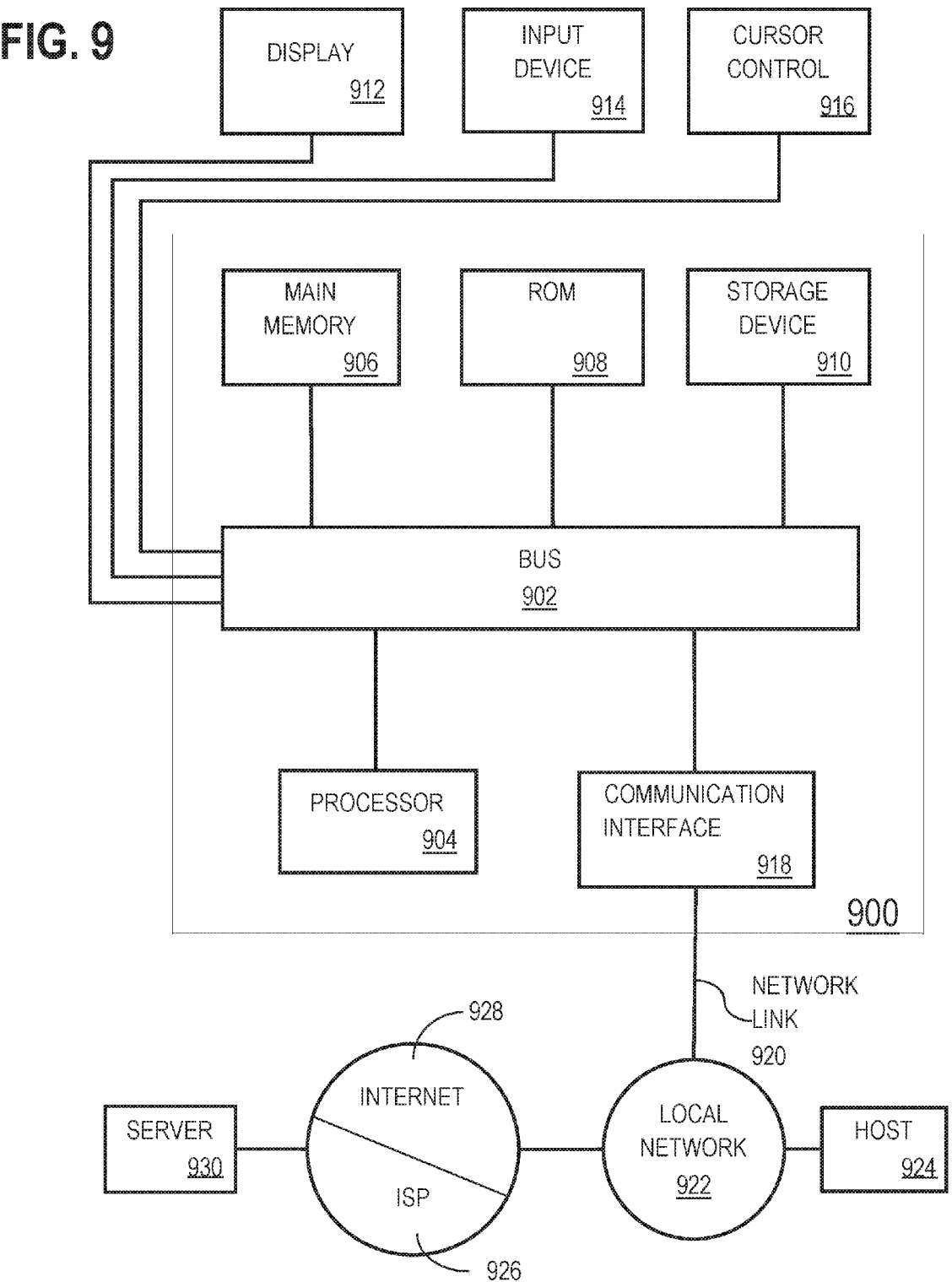
FIG. 9 illustrates a computer system upon which one or more embodiments may be implemented.

For example, FIG. 9 is a block diagram that illustrates a computer system 900 upon which one or more embodiments may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for clustering a set of data points, the method comprising:
    generating, within volatile or non-volatile storage of at least one computing device, a first cluster that includes a set of data points;
    computing, by at least one process executing on the at least one computing device, a set of similarity values for a plurality of data point pairs within the set of data points;
    wherein each similarity value in the set of similarity values corresponds to a respective data point pair from the plurality of data point pairs and is computed by the at least one process based, at least in part, on a distance between the respective data point pair and a set of one or more arbiter data points;
    partitioning, within volatile or non-volatile storage of the at least one computing device, the first cluster into a set of two or more clusters;
    wherein each cluster of the two or more clusters includes a respective subset of data points from the set of data points;
    determining, by at least one process executing on the at least one computing device and based at least in part on the set of similarity values, whether to partition at least one cluster of the set of two or more clusters to generate a final set of clusters;
    outputting, by the at least one computing device, an analytical result that is generated, based at least in part, by analyzing cluster-specific data representing one or more clusters from the final set of clusters.

2. The method of claim 1, wherein the set of one or more arbiter data points includes a plurality of data points from the first cluster that are not part of the respective data point pair.

3. The method of claim 1, wherein computing, by at least one process executing on the at least one computing device, a set of similarity values for a plurality of data point pairs within the set of data points comprises computing a similarity matrix expressed by the formula:

$$t_{i,j} = \begin{cases} \dfrac{1}{n-2} \sum_{a \notin \{x_i, x_j\}} \rho TAC(x_i, x_j \mid a), & \text{if } i \neq j \\ 1, & \text{if } i = j \end{cases}$$

where i represents a row number in the similarity matrix for a row corresponding to data point $x_i$, j represents a column number in the similarity matrix for a column corresponding to data point $x_j$, $t_{i,j}$ represents the similarity value for data point pair $x_i$, $x_j$, n represents the number of data points in the first cluster, $\sum_{a \notin \{x_i, x_j\}} \rho TAC(x_i, x_j \mid a)$ represents a summation of tri-point arbitration coefficients calculated using all other data points in the first cluster other than the data point pair $x_i$, $x_j$, and $\rho TAC(x_i, x_j \mid a)$ represents a tri-point arbitration coefficient expressed by the formula:

$$\rho TAC(x_i, x_j \mid a) = \frac{\min\{\rho(x_i, a), \rho(x_j, a)\} - \rho(x_i, x_j)}{\max\{\rho(x_i, x_j), \min\{\rho(x_i, a), \rho(x_j, a)\}\}}$$

where $\rho$ represents a distance between two data points.

4. The method of claim 1,
    wherein the set of two or more clusters includes a third cluster and a fourth cluster;
    wherein determining, by at least one process executing on the at least one computing device and based at least in part on the set of similarity values, whether to partition at least one cluster of the set of two or more clusters comprises:
        determining, based at least in part on the set of similarity values, whether a similarity between the third cluster and the fourth cluster satisfies a threshold;
        in response to determining that the similarity between the third cluster and the fourth cluster does not satisfy the threshold, partitioning at least one of the third cluster and the fourth cluster;

in response to determining that the similarity between the third cluster and the fourth cluster satisfies the threshold, preventing further partitioning of the third cluster and the fourth cluster.

5. The method of claim 4, wherein determining, based at least in part on the set of similarity values, whether a similarity between the third cluster and the fourth cluster satisfies a threshold comprises:

computing a sum of similarity values for a set of data point pairs;

wherein each data point pair in the set of data point pairs includes a respective data point from the third cluster and a respective data point from the fourth cluster;

determining that the similarity of the third cluster and the fourth cluster satisfies the threshold if the sum is greater than a threshold value.

6. The method of claim 4, wherein determining, based at least in part on the set of similarity values, whether a similarity between the third cluster and the fourth cluster satisfies a threshold comprises:

determining a count of how many data point pairs in a set of data point pairs have a similarity value that is greater than a threshold value;

wherein each data point pair in the set of data point pairs includes a respective data point from the third cluster and a respective data point from the fourth cluster;

determining that the similarity of the third cluster and the fourth cluster satisfies the threshold if the count exceeds a threshold number.

7. The method of claim 1, further comprising iteratively partitioning the at least one cluster of the set of two or more clusters until a similarity between new clusters obtained from a partitioned cluster satisfies a threshold to obtain the final set of clusters.

8. The method of claim 1, wherein the set of data points is a set of centroids, each centroid representing in the set of centroids representing a respective cluster from a plurality of clusters;

the method further comprising:

grouping the set of centroids into a final set of clusters based at least in part on the set of similarity values;

wherein a first centroid and a second centroid are part of a first final cluster in the final set of clusters;

assigning data points from the respective clusters represented by the first centroid and the second centroid to the first final cluster in the final set of clusters.

9. The method of claim 8, wherein at least one similarity value in the set of similarity values is weighted based, at least in part, on how many data points are in at least one respective cluster from the plurality of clusters.

10. The method of claim 1, wherein partitioning, within volatile or non-volatile storage of the computing device, the first cluster into a set of two or more clusters comprises:

generating a similarity matrix using the set of similarity values;

generating a Laplacian matrix based on the similarity matrix;

determining how many zero eigenvalues exist in the transformed similarity matrix;

wherein partitioning the first cluster into a set of two or more clusters is performed in response to determining that the number of zero eigenvalues exceeds a threshold;

wherein data points from the first cluster are assigned to one of the two or more clusters based on a set of one or more eigenvectors that have a zero eigenvalue.

11. The method of claim 1, wherein determining, by at least one process executing on the at least one computing device and based at least in part on the set of similarity values, whether to partition at least one cluster of the set of two or more clusters to obtain the final set of clusters comprises:

determining, based on the set of similarity values, that more data points are similar between the two or more clusters than not;

in response to determining that more data points are similar between the two or more clusters than not, stopping partitioning of the set of data points.

12. One or more non-transitory computer-readable media storing instructions for clustering a set of data points, the instructions including:

instructions which, when executed by one or more hardware processors, cause generating, within volatile or non-volatile storage, a first cluster that includes a set of data points;

instructions which, when executed by one or more hardware processors, cause computing a set of similarity values for a plurality of data point pairs within the set of data points;

wherein each similarity value in the set of similarity values corresponds to a respective data point pair from the plurality of data point pairs and is computed based, at least in part, on a distance between the respective data point pair and a set of one or more arbiter data points;

instructions which, when executed by one or more hardware processors, cause partitioning, within volatile or non-volatile storage, the first cluster into a set of two or more clusters;

wherein each cluster of the two or more clusters includes a respective subset of data points from the set of data points;

instructions which, when executed by one or more hardware processors, cause determining, based at least in part on the set of similarity values, whether to partition at least one cluster of the set of two or more clusters to generate a final set of clusters;

instructions which, when executed by one or more hardware processors, cause outputting, by the at least one computing device, an analytical result that is generated, based at least in part, by analyzing cluster-specific data representing one or more clusters from the final set of clusters.

13. The one or more non-transitory computer-readable media of claim 12, wherein the set of one or more arbiter data points includes a plurality of data points from the first cluster that are not part of the respective data point pair.

14. The one or more non-transitory computer-readable media of claim 12, wherein instructions for computing a set of similarity values for a plurality of data point pairs within the set of data points comprise instructions for computing a similarity matrix expressed by the formula:

$$t_{i,j} = \begin{cases} \dfrac{1}{n-2} \sum_{a \notin \{x_i, x_j\}} \rho TAC(x_i, x_j \mid a), & \text{if } i \neq j \\ 1, & \text{if } i = j \end{cases}$$

where i represents a row number in the similarity matrix for a row corresponding to data point $x_i$, j represents a column number in the similarity matrix for a column corresponding to data point $x_j$, $t_{i,j}$ represents the similarity value for data point pair $x_i$, $x_j$, n represents the number of data points in the first cluster, $\Sigma_{a\notin\{x_i,x_j\}}\rho TAC(x_i, x_j|a)$ represents a summation of tri-point arbitration coefficients calculated using all other data points in the first cluster other than the data point pair $x_i$, $x_j$, and $\rho TAC(x_i, x_j|a)$ represents a tri-point arbitration coefficient expressed by the formula:

$$\rho TAC(x_i, x_j \mid a) = \frac{\min\{\rho(x_i, a), \rho(x_j, a)\} - \rho(x_i, x_j)}{\max\{\rho(x_i, x_j), \min\{\rho(x_i, a), \rho(x_j, a)\}\}}$$

where $\rho$ represents a distance between two data points.

15. The one or more non-transitory computer-readable media of claim 12,
wherein the set of two or more clusters includes a third cluster and a fourth cluster;
wherein instructions for determining, based at least in part on the set of similarity values, whether to partition at least one cluster of the set of two or more clusters comprise:
instructions which, when executed by one or more hardware processors, cause determining, based at least in part on the set of similarity values, whether a similarity between the third cluster and the fourth cluster satisfies a threshold;
instructions which, when executed by one or more hardware processors, cause in response to determining that the similarity between the third cluster and the fourth cluster does not satisfy the threshold, partitioning at least one of the third cluster and the fourth cluster;
instructions which, when executed by one or more hardware processors, cause in response to determining that the similarity between the third cluster and the fourth cluster satisfies the threshold, preventing further partitioning of the third cluster and the fourth cluster.

16. The one or more non-transitory computer-readable media of claim 15,
wherein instructions for determining, based at least in part on the set of similarity values, whether a similarity between the third cluster and the fourth cluster satisfies a threshold comprise:
instructions which, when executed by one or more hardware processors, cause computing a sum of similarity values for a set of data point pairs;
wherein each data point pair in the set of data point pairs includes a respective data point from the third cluster and a respective data point from the fourth cluster;
instructions which, when executed by one or more hardware processors, cause determining that the similarity of the third cluster and the fourth cluster satisfies the threshold if the sum is greater than a threshold value.

17. The one or more non-transitory computer-readable media of claim 15, wherein instructions for determining, based at least in part on the set of similarity values, whether a similarity between the third cluster and the fourth cluster satisfies a threshold comprise:
instructions which, when executed by one or more hardware processors, cause determining a count of how many data point pairs in a set of data point pairs have a similarity value that is greater than a threshold value;
wherein each data point pair in the set of data point pairs includes a respective data point from the third cluster and a respective data point from the fourth cluster;
instructions which, when executed by one or more hardware processors, cause determining that the similarity of the third cluster and the fourth cluster satisfies the threshold if the count exceeds a threshold number.

18. The one or more non-transitory computer-readable media of claim 12,
further comprising instructions which, when executed by one or more hardware processors, cause iteratively partitioning the at least one cluster of the set of two or more clusters until a similarity between new clusters obtained from a partitioned cluster satisfies a threshold to obtain the final set of clusters.

19. The one or more non-transitory computer-readable media of claim 12,
wherein the set of data points is a set of centroids, each centroid representing in the set of centroids representing a respective cluster from a plurality of clusters;
the instructions further including:
instructions which, when executed by one or more hardware processors, cause grouping the set of centroids into a final set of clusters based at least in part on the set of similarity values;
wherein a first centroid and a second centroid are part of a first final cluster in the final set of clusters;
instructions which, when executed by one or more hardware processors, cause assigning data points from the respective clusters represented by the first centroid and the second centroid to the first final cluster in the final set of clusters.

20. The one or more non-transitory computer-readable media of claim 19,
wherein at least one similarity value in the set of similarity values is weighted based, at least in part, on how many data points are in at least one respective cluster from the plurality of clusters.

21. The one or more non-transitory computer-readable media of claim 12,
wherein instructions for partitioning, within volatile or non-volatile storage of the computing device, the first cluster into a set of two or more clusters comprise:
instructions which, when executed by one or more hardware processors, cause generating a similarity matrix using the set of similarity values;
instructions which, when executed by one or more hardware processors, cause generating a Laplacian matrix based on the similarity matrix;
instructions which, when executed by one or more hardware processors, cause determining how many zero eigenvalues exist in the transformed similarity matrix;
wherein partitioning the first cluster into a set of two or more clusters is performed in response to determining that the number of zero eigenvalues exceeds a threshold;
wherein data points from the first cluster are assigned to one of the two or more clusters based on a set of one or more eigenvectors that have a zero eigenvalue.

22. The one or more non-transitory computer-readable media of claim 12, wherein instructions for determining, based at least in part on the set of similarity values, whether to partition at least one cluster of the set of two or more clusters to obtain the final set of clusters comprise:
    instructions which, when executed by one or more hardware processors, cause determining, based on the set of similarity values, that more data points are similar between the two or more clusters than not;
    instructions which, when executed by one or more hardware processors, cause in response to determining that more data points are similar between the two or more clusters than not, stopping partitioning of the set of data points.

\* \* \* \* \*

UNITED STATES PATENT AND TRADEMARK OFFICE
CERTIFICATE OF CORRECTION

PATENT NO.       : 10,073,906 B2
APPLICATION NO.  : 15/140358
DATED            : September 11, 2018
INVENTOR(S)      : Edwina Lu et al.

Page 1 of 1

It is certified that error appears in the above-identified patent and that said Letters Patent is hereby corrected as shown below:

In the Specification

On Column 1, Lines 7-8, the first patent number "9,147,162" referenced as a 'related application' and titled "Similarity Analysis with Tri-Point Dara Arbitration", should be changed to No. "9,147,167".

Signed and Sealed this
Twenty-eighth Day of May, 2019

Andrei Iancu
*Director of the United States Patent and Trademark Office*